United States Patent
Jung et al.

(10) Patent No.: US 7,690,249 B2
(45) Date of Patent: Apr. 6, 2010

(54) METHOD FOR DETECTING A JAMMED CHARGE MOVEMENT FLAP OF AN INTERNAL COMBUSTION ENGINE

(75) Inventors: Olaf Jung, Cleebronn (DE); Joerg Fischer, Cleebronn (DE)

(73) Assignee: Robert Bosch GmbH, Stuttgart (DE)

( * ) Notice: Subject to any disclaimer, the term of this patent is extended or adjusted under 35 U.S.C. 154(b) by 89 days.

(21) Appl. No.: 11/805,154

(22) Filed: May 21, 2007

(65) Prior Publication Data
US 2008/0006084 A1 Jan. 10, 2008

(30) Foreign Application Priority Data
May 19, 2006 (DE) .................. 10 2006 023 692

(51) Int. Cl.
*G01M 15/04* (2006.01)
(52) U.S. Cl. .................. 73/114.36; 73/114.32
(58) Field of Classification Search ............ 73/114.31, 73/114.32, 114.33, 114.36, 114.37
See application file for complete search history.

(56) References Cited

U.S. PATENT DOCUMENTS

| | | | |
|---|---|---|---|
| 7,237,759 B2 * | 7/2007 | Andoh et al. ............. 251/208 |
| 7,251,989 B2 * | 8/2007 | Baeuerle .................. 73/114.37 |
| 2004/0103646 A1 * | 6/2004 | Weigand et al. ............ 60/280 |
| 2004/0216519 A1 * | 11/2004 | Baeuerle .................. 73/118.1 |
| 2008/0245347 A1 * | 10/2008 | Collet ...................... 123/520 |
| 2008/0249698 A1 * | 10/2008 | Yokoyama et al. .......... 701/107 |

FOREIGN PATENT DOCUMENTS

| | | |
|---|---|---|
| DE | 101 14 375 | 10/2002 |
| DE | 101 14 376 | 10/2002 |
| DE | 101 64 729 | 2/2003 |
| DE | 101 64 726 | 3/2003 |
| DE | 102 08 993 | 9/2003 |

* cited by examiner

*Primary Examiner*—Eric S McCall
(74) *Attorney, Agent, or Firm*—Kenyon & Kenyon LLP

(57) ABSTRACT

A method for detecting a jammed charge movement flap of an internal combustion engine, a volumetric air flow of the internal combustion engine being ascertained as a measured volumetric air flow and as a modeled volumetric air flow. In the event of a deviation of the measured volumetric air flow from the modeled volumetric air flow which is greater than a predefined value, a jammed charge movement flap is automatically detected.

10 Claims, 5 Drawing Sheets

METHOD FOR DETECTING A JAMMED CHARGE MOVEMENT FLAP OF AN INTERNAL COMBUSTION ENGINE

FIELD OF THE INVENTION

The present invention relates to a method and a device for detecting a jammed charge movement flap of an internal combustion engine, a volumetric air flow of the internal combustion engine being ascertained as a measured volumetric air flow and as a modeled volumetric air flow.

BACKGROUND INFORMATION

The present invention is used in particular in a naturally aspirated gasoline engine. This engine has a charge movement flap (also abbreviated as CMF), which increases the movement of the charge to be ignited in the combustion chamber in its closed position. The combustion thus becomes more stable, and more exhaust gas may be recirculated in the event of an external exhaust gas recirculation system. The fuel consumption thus decreases. Since the charge movement is increased, specific operating parameters of the engine are to be adapted in accordance with the current position of the charge movement flap. These are ignition angle, variables of the air mass ascertainment, and advance angle of the injection, for example. An incorrect position of the charge movement flap accordingly also results in the engine being operated using false parameters, it also being possible in this situation that the engine will be damaged in continuous operation. Therefore, a function check of the charge movement flap is essential. Until now, the function check was predominantly fulfilled on the basis of a position feedback using sensors, as described in German Patent Application No. DE 102 08 993, for example. In contrast, German Patent Application No. DE 101 14 375, German Patent Application No. DE 101 14 376, and German Patent Application No. DE 101 64 726 suggest diagnosing the position of the charge movement flap on the basis of a knock control. German Patent Application No. DE 101 64 729 suggests diagnosing the position of the charge movement flap on the basis of uneven running.

In the method according to the related art, a separate test procedure is to be performed to ascertain a malfunction of the charge movement flap.

SUMMARY OF THE INVENTION

It is an object of the present invention to provide a method and a device which allow a jammed charge movement flap to be ascertained on the basis of operating parameters provided in operation of the internal combustion engine.

This object is achieved by a method for detecting a jammed charge movement flap of an internal combustion engine, a volumetric air flow of the internal combustion engine being ascertained as a measured volumetric air flow and as a modeled volumetric air flow, a jammed charge movement flap automatically being detected in the event of a deviation of the measured volumetric air flow from the modeled volumetric air flow which is greater than a predefined value. The predefined value is determined experimentally or by computer simulation, for example, and is to consider measurement inaccuracies of the measured volumetric air flow and/or inaccuracies in the modeling of the modeled volumetric air flow, for example, due to the limited resolution of the values or systematic deviations of the measurement or model. A jammed charge movement flap is first detected in the event of a deviation of the measured value from the modeled value above this lower threshold. The predefined value is selected as defined by a tolerance range in such a way that a jammed charge movement flap is reliably detected and, in addition, erroneous detection, i.e., detection of a jammed charge movement flap if the charge movement flap is operational and trouble-free is prevented. The predefined value may be selected as very small for this purpose. According to a refinement of the present invention, the deviation of the measured volumetric air flow from the modeled volumetric air flow occurs at an operating point of the internal combustion engine in which the charge movement flap assumes a completely open position as the setpoint position. A charge movement flap which is jammed open is preferably detected if the measured volumetric air flow deviates by a first value from the modeled volumetric air flow. An at least partially closed jammed charge movement flap is preferably detected if the measured volumetric air flow deviates from the modeled volumetric air flow by a second value which has a greater absolute value than the first value. The first and second values are preferably selected in such a way that they differ from one another sufficiently to allow a clear differentiation between the two values. In a refinement of the present invention, the position of a throttle valve is incorporated in the modeled volumetric air flow. The position is ascertained by a sensor, for example, and provided to a control unit as an electrical signal. The measured volumetric air flow is preferably determined from a signal of an air flow meter. Alternatively or additionally, the measured volumetric air flow may be determined from a signal of an intake manifold pressure sensor. In a refinement of the present invention, an ambient pressure, which is ascertained using the intake manifold pressure sensor at full load, is incorporated as a reference value in the determination of the modeled volumetric air flow. This is advantageous in particular if no independent ambient pressure sensor is provided. The reference value preferably only remains valid for a limited time.

The object cited at the beginning is also achieved by a device, in particular a control unit for an internal combustion engine, having means for detecting a jammed charge movement flap of an internal combustion engine, a volumetric air flow of the internal combustion engine being ascertained as a measured volumetric air flow and as a modeled volumetric air flow, a jammed charge movement flap automatically being detected in the event of a deviation of the measured volumetric air flow from the modeled volumetric air flow.

DETAILED DESCRIPTION

Figure 1:
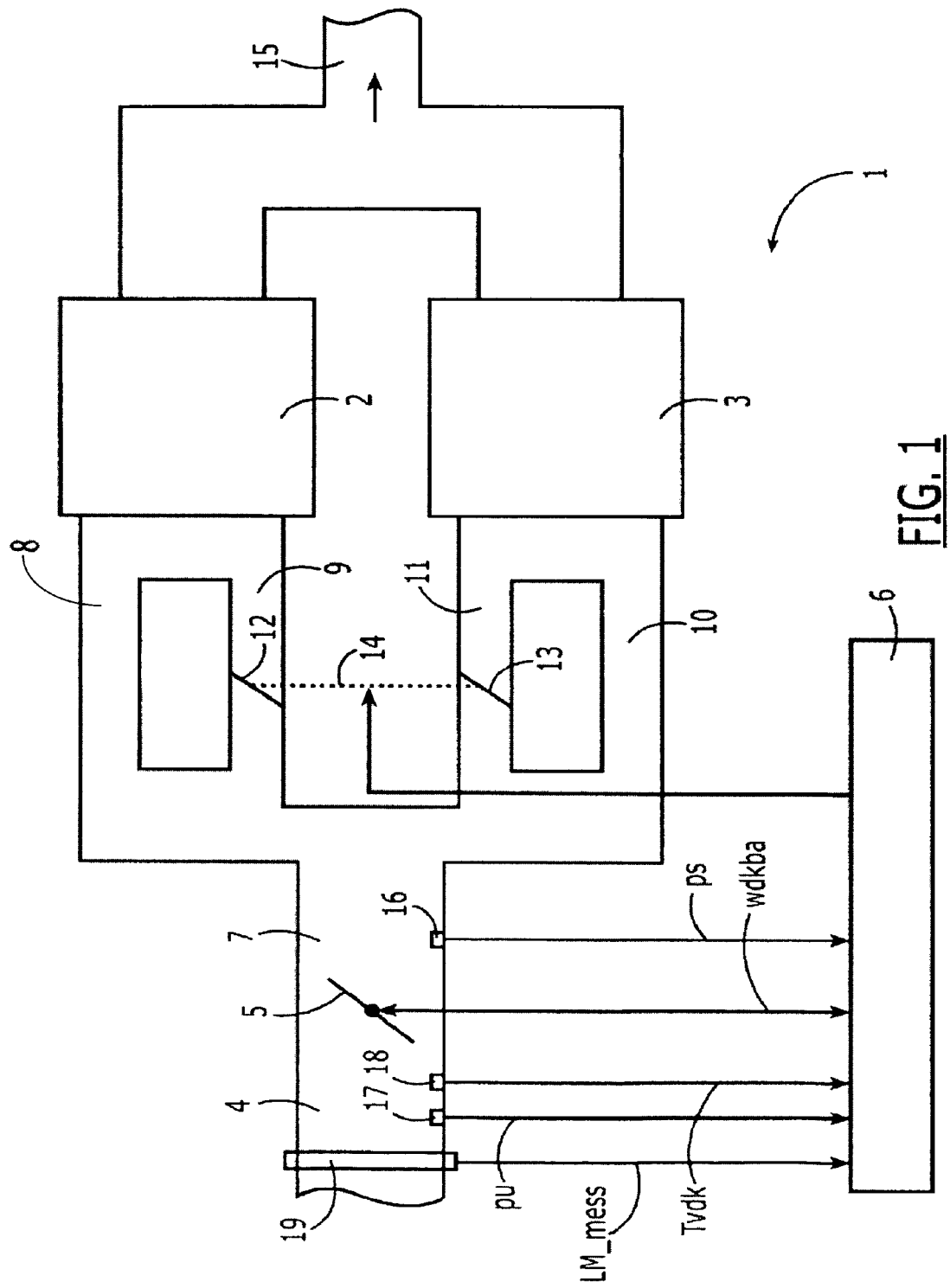
FIG. 1 shows a sketch of an internal combustion engine.

In FIG. 1, reference numeral 1 identifies an internal combustion engine which drives a vehicle, for example. Internal combustion engine 1 may be implemented as a gasoline engine or as a diesel engine, for example. In the following, it is assumed as an example that internal combustion engine 1 is implemented as a gasoline engine. In the present example according to FIG. 1, internal combustion engine 1 includes two cylinders 2, 3. Alternatively, internal combustion engine 1 may also include only one cylinder or more than two cylinders. Both cylinders 2, 3 are supplied with fresh air via a shared air supply 4. The flow direction of the fresh air in air supply 4 is indicated by an arrow. The volumetric air flow supplied to both cylinders 2, 3 via shared air supply 4 may be influenced via the position of a second actuator 5, such as a throttle valve. For this purpose, throttle valve 5 is controlled by an engine controller 6 using a final control element, such as an actuator which is driven by an electric motor or the like. The position of throttle valve 5 is controlled by engine controller 6 to implement a driver command, for example. The driver command is in turn derived from the degree of actuation of an accelerator pedal (not shown in FIG. 1).

The area of air supply 4 downstream from throttle valve 5 is referred to as an intake manifold and is identified in FIG. 1 by reference numeral 7. Initially shared intake manifold 7 then branches into two air channels. A first channel supplies the fresh air from shared intake manifold 7 to first cylinder 2 and a second air channel supplies the fresh air from shared intake manifold 7 to second cylinder 3. The first air channel according to FIG. 1 includes a first air line 8 and a second air line 9. The second air channel according to FIG. 1 includes a third air line 10 and a fourth air line 11. A first charge movement flap 12 is situated in second air line 9. A second charge movement flap 13 is situated in fourth air line 11. Both charge movement flaps 12, 13 are rigidly connected to one another and form a first actuator 14, which is also controlled by engine controller 6. First actuator 14 is controlled by engine controller 6 in such a way that both charge movement flaps 12, 13 are either completely open or completely closed.

In a partial load range, engine controller 6 controls first actuator 14 in such a way that both charge movement flaps 12, 13 are completely closed, so that the resulting opening cross section for the first air channel and the second air channel is reduced, because the air in the first air channel may only be supplied to first cylinder 2 via first air line 8 and the air in the second air channel may only be supplied to second cylinder 3 via third air line 10. In contrast, during full-load operation of internal combustion engine 1, engine controller 6 controls first actuator 14 in such a way that both charge movement flaps 12, 13 are completely open, so that a maximum possible air throughput is possible through both cylinders 2, 3 and thus no performance reduction is caused by both charge movement flaps 12, 13. The devices required for injecting fuel and for igniting the air/fuel mixture produced in cylinders 2, 3 are not shown in FIG. 1 for the sake of clarity and may be implemented and controlled in the way known to those skilled in the art. The exhaust gas produced upon the combustion of the air/fuel mixture in the combustion chambers of cylinders 2, 3 is then expelled into a shared exhaust system 15, whose flow direction is also indicated in FIG. 1 by an arrow. Inlet and outlet valves of both cylinders 2, 3 are also not shown in FIG. 1 for reasons of clarity and may be implemented and controlled in the way known to those skilled in the art.

An intake manifold pressure sensor 16, which measures intake manifold pressure ps and relays the measured value to engine controller 6, is situated in shared intake manifold 7. A second pressure sensor 17 is situated in shared air supply 4 upstream from throttle valve 5, which measures pressure pu upstream from throttle valve 5 and relays the measured value to engine controller 6. In the following, it is to be assumed for the sake of simplicity that this pressure approximately corresponds to the ambient pressure. However, this assumption no longer applies for the case in which internal combustion engine 1 is supercharged by an exhaust-gas turbocharger. Therefore, reference is generally made in the following to pressure pu upstream from throttle valve 5. Furthermore, a temperature sensor 18 which measures temperature Tvdk upstream from throttle valve 5 and relays the measured value to engine controller 6 is situated upstream from throttle valve 5 in shared air supply 4. Position wdkba of throttle valve 5 is detected via a position feedback device, in the form of a potentiometer, for example, and relayed to engine controller 6. An air flow meter 19, such as a hot-film air-mass meter (HFM) or the like, is situated in shared intake manifold 7 and provides an electrical signal LM_mess to the engine controller, which represents the sucked-in air quantity and/or the volumetric air flow (air quantity per unit of time). Signal LM_mess represents the measured volumetric air flow.

In the following, an exemplary embodiment of a method according to the present invention is explained on the basis of one of charge movement flaps 12, 13. Engine controller 6 checks the function of charge movement flaps 12, 13 cyclically in specific operating situations and may detect whether the charge movement flap is no longer operational on the basis of the sensor values of intake manifold pressure sensor 16, pressure sensor 17, and the position of throttle valve 5, for example. The engine controller has various signals for volumetric air flow (air throughput) LM of the engine, for example, i.e., an indirect signal via one of pressure sensors 16, 17 or a direct signal via air flow meter 19, each of which represents measured volumetric air flow LM_mess. In addition, the air quantity may also be determined, which was ascertained on the basis of the open cross section of throttle valve 5 and preferably also on the basis of the speed of a crankshaft of the internal combustion engine, from which modeled volumetric air flow LM_mod is ascertained. This air quantity is ascertained on the basis of a throttle valve model of throttle valve 5 and represents the modeled (ideal) volumetric air flow, which flows into the engine in the case of a correctly functioning system.

The volumetric air flow which was ascertained using pressure sensors 16, 17 or air flow meter 19 represents the actual volumetric air flow. The ratio of the modeled volumetric air flow and the actual volumetric air flow is used for the purpose of determining the incorrect position of a defective charge movement flap 12, 13. This ratio is also referred to as the secondary load offset, the modeled air quantity being referred to as the modeled load value and the measured air quantity being referred to as the actual load value.

In the event of a closed charge movement flap 12, 13, throttling occurs from a certain speed and a certain charge movement flap angle, which causes the volumetric air flow to decrease in relation to an open position of the charge movement flap. In addition, up to a specific pressure ratio of intake manifold pressure to ambient pressure, it causes the intake manifold pressure to increase in relation to the open position. These two effects are used in the method according to the present invention for the purpose of detecting the incorrect position of the charge movement flap.

If the charge movement flap is no longer operational, the probability is very high that the charge movement flap is in one of the two end positions or is jammed in one of these positions. In general, the charge movement flap is placed in the open position at high speeds because of its throttle action. The comparison between modeled and measured volumetric air flows is performed in this position.

If a second significant value arises as a difference between the modeled volumetric air flow and the actual volumetric air flow, the charge movement flap tends to be in a closed position. If a first smaller value arises as the difference, the charge movement flap tends to be in the open position. What is a significant difference and a smaller difference of the volumetric air flows may be determined as numeric values experimentally for the particular internal combustion engine. The distance of the first value from the second value is selected in such a way that the two. may be reliably differentiated from one another.

If the position has been determined once, possible substitute measures of the engine controller may be canceled and the engine may be operated using parameters tailored to the position of the charge movement flap. If none of the conditions applies, an intermediate position is recognized and the substitute measures are used further.

An exemplary embodiment of a method according to the present invention is shown in the following figures for an internal combustion engine without ambient pressure sensor 17 and without air flow meter 19. However, the internal combustion engine has an intake manifold pressure sensor 16 which is situated downstream from the throttle valve as shown in FIG. 1.

Figure 2:
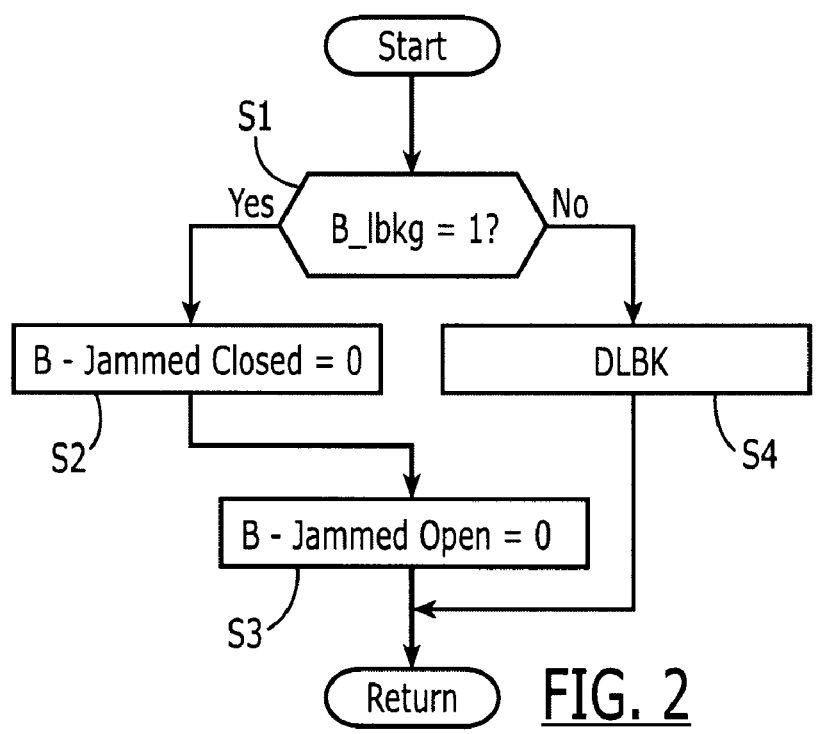
FIG. 2 shows a flow chart of a method for monitoring the position of an actuator.

According to FIG. 2, it is checked in step S1 whether the charge movement flap functions correctly (B_lbkg=1). If the charge movement flap is functioning correctly, corresponding bits B_jammedclosed and B_jammedopen, which indicate the incorrect position of the charge movement flap, are set to zero in steps S2 and S3.

However, if the charge movement flap is not functioning correctly, function DBLK which checks the position in which the charge movement flap is jammed is executed in step S4.

Figure 3:
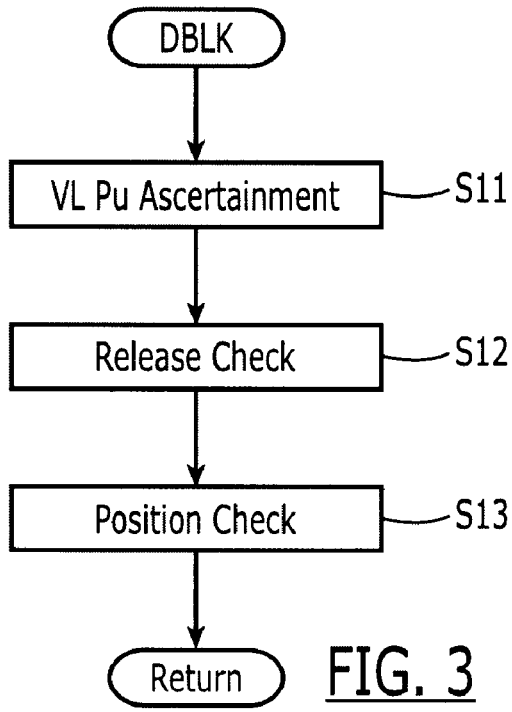
FIG. 3 shows a flow chart having the function blocks of the method for monitoring the position of an actuator.
Figure 4:
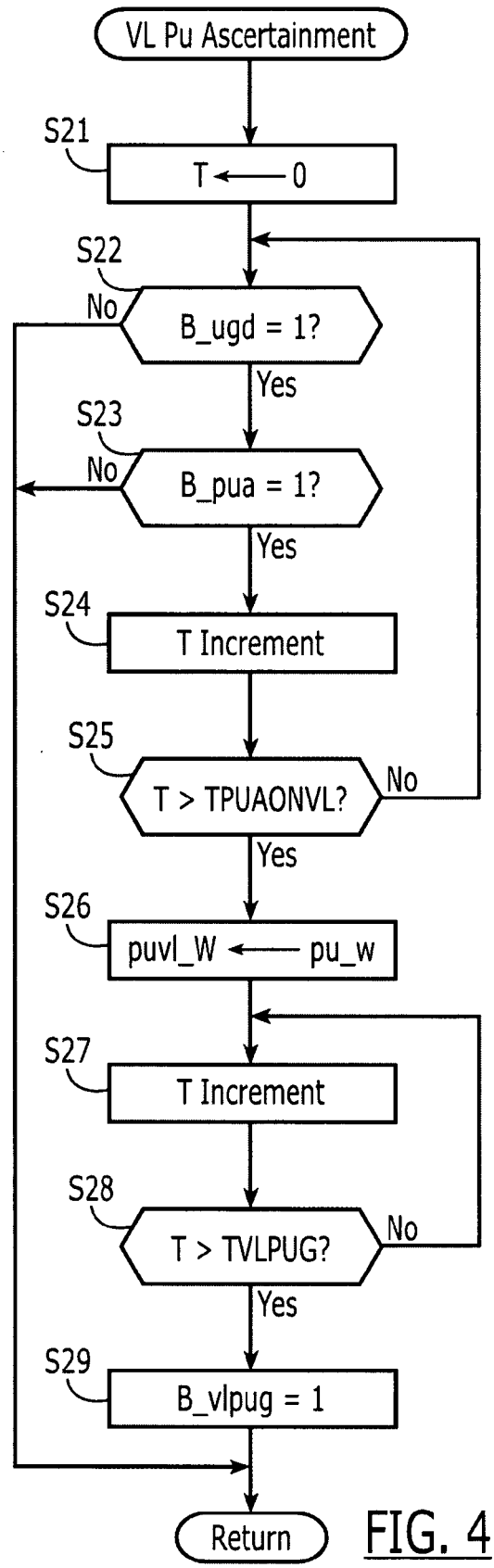
FIG. 4 shows a flow chart having the function blocks for ascertaining an ambient pressure adaptation.
Figure 5:
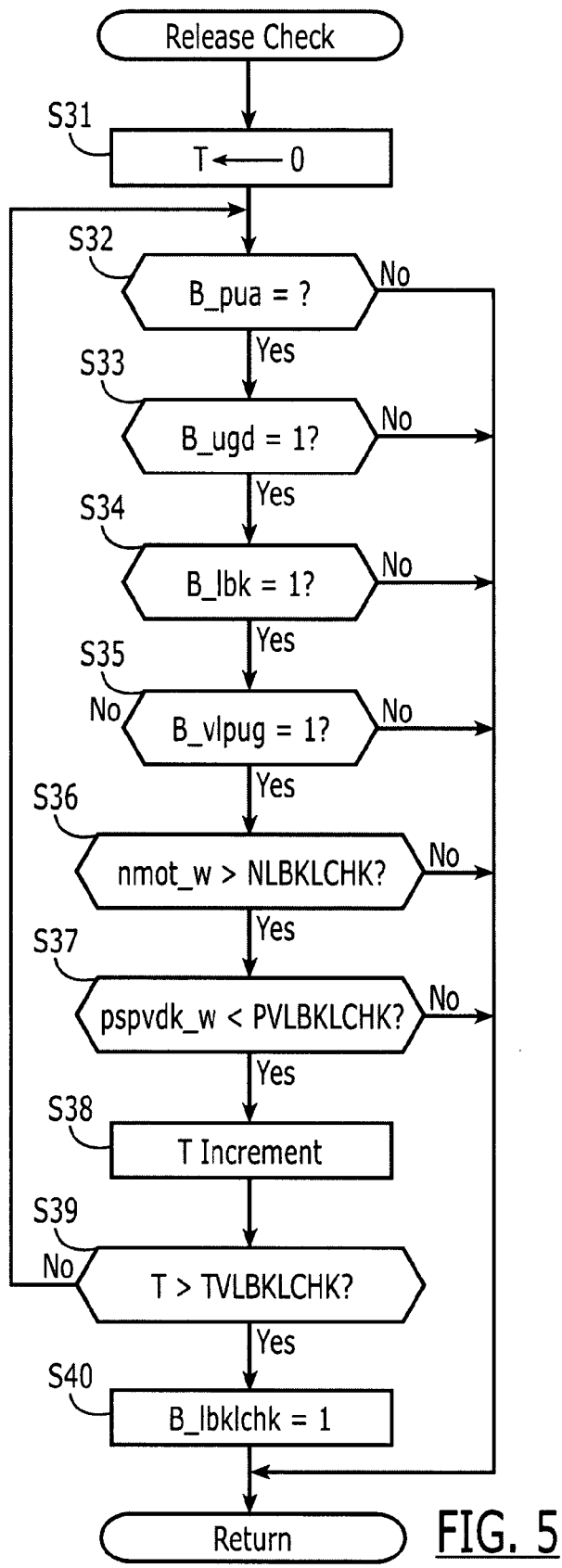
FIG. 5 shows a flow chart having the function blocks of a release check.
Figure 6:
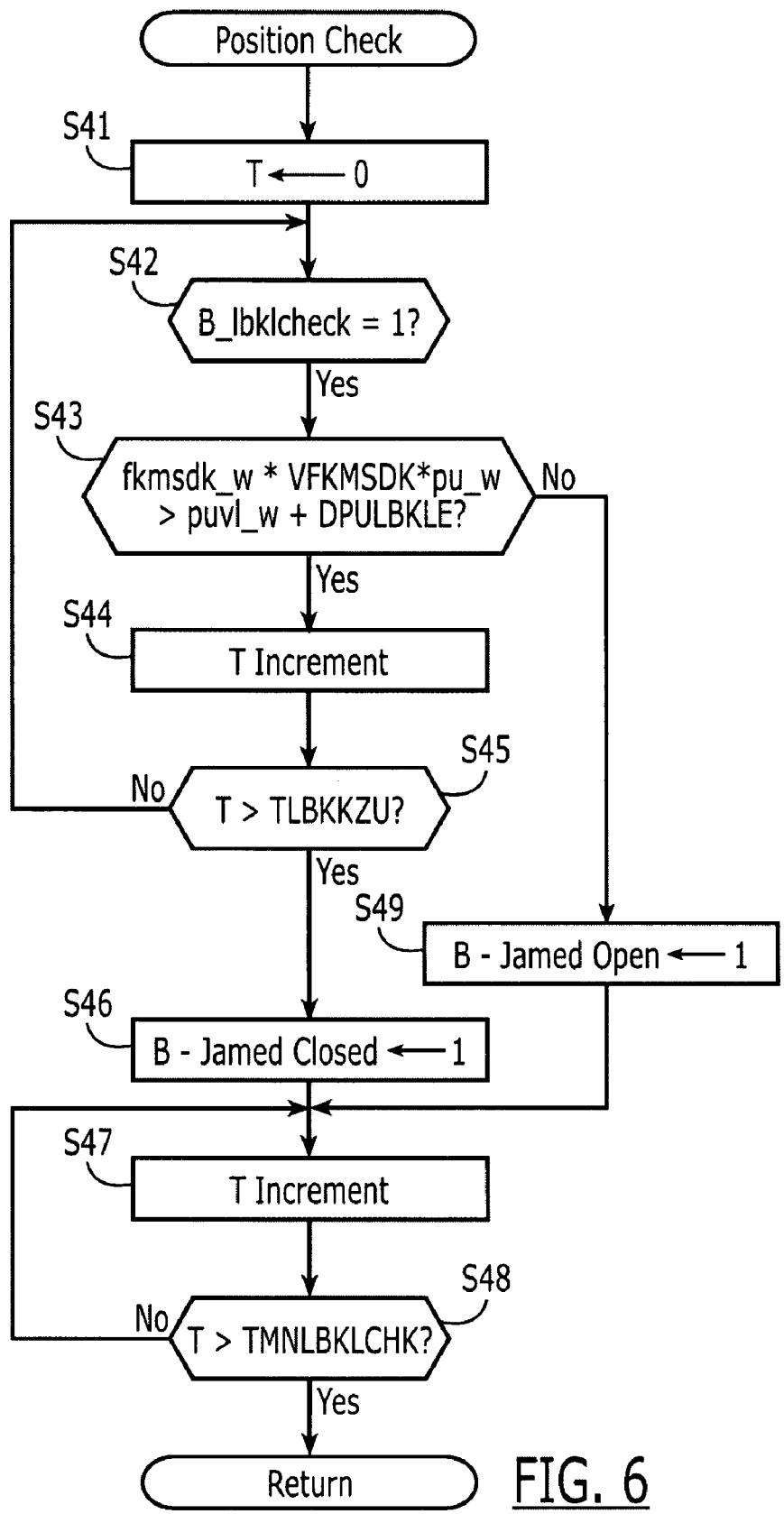
FIG. 6 shows a flow chart having the function blocks of a position check.

Function DBLK is illustrated further in FIG. 3. In a step S11, the ambient pressure adaptation which is described further in FIG. 4 is checked. In a step S12, a release check which is described further in FIG. 5 is performed. Finally, in a step S13, the position check which is described further in FIG. 6 is performed.

The ambient pressure adaptation is ascertained in FIG. 4. In this exemplary embodiment, the internal combustion engine has no ambient pressure sensor and no air flow meter. However, the internal combustion engine has an intake manifold pressure sensor which is situated downstream from the throttle valve. As a reference, function DLBK uses the intake manifold pressure ascertained at full load. At full load, the throttle valve is completely open and displays essentially no throttle effect. Since the intake manifold pressure is ascertained directly, without secondary load offset, using the intake manifold pressure sensor, it essentially corresponds to the ambient pressure.

When full load is no longer used, the ambient pressure determined at full load may only remain valid for a specific time. A position check may be performed as long as the specific ambient pressure remains valid.

The ambient pressure adaptation is illustrated in detail in FIG. 4. In step S21, a timer T is set to zero. In steps S22 and S23, it is checked whether the engine is unthrottled (B_ugd=1) and whether the ambient pressure adaptation is active (B_pua=1), and T is incrementally increased in step S24. If both conditions are fulfilled during a time TPUAONVL in step S25, ambient pressure puvl_w is set in step S26 to intake manifold pressure pu_w and it is indicated using B_vlpug=1 that the ambient pressure is valid. In steps S27, S28, and S29, value B_vlpug is set to 0 after validity time TVLPUG. The learned ambient pressure thus becomes invalid after this time and must be relearned before a new diagnosis is possible.

FIG. 5 shows a flow chart having the function blocks of a release check. The following position check is only performed after a successful release check. The release check is successful in step S40, after it has been determined in steps S31 through S39 that the ambient pressure adaptation is active during time TVLBKLCHK (B_pua=1), the internal combustion engine is not to be unthrottled (B_ugd=0), the charge movement flap is not to be closed (B_lbk=0), the ambient pressure is valid (B_vlpug=1), the speed of the internal combustion engine is greater than a threshold value (nmot_w>NLBKLCHK), and the pressure ratio between the intake manifold pressure and the pressure in front of the throttle valve is less than a threshold value (pspvdk_w<PVLBKLCHK), i.e., the pressure drop at the throttle valve is less than a threshold value.

FIG. 6 shows a flow chart having the function blocks of the actual position check. In step S41, T is set to zero. It is checked in step S42 whether the release check was successful (B_lbklcheck=1). In step S43, inter alia, a rapid secondary load offset fkmsdk_w is performed as follows. A charge movement flap jamming in the closed position results, from a specific speed and a specific pressure ratio, in unlearning of the rapid secondary load offset and consequently in unlearning of the ambient pressure if the charge movement flap is actually supposed to be open. Rapid secondary load offset fkmsdk_w is ascertained from the ratio of the actual volumetric air flow to the modeled volumetric air flow, as already explained. Preferably, rapid secondary load offset fkmsdk_w is multiplied by a weighting factor for weighting the dynamic influence of fkmsdk_w. On this basis, it is determined in steps S42 through S46 that in the event of an error the charge movement flap sticks in the closed position if the product of intake manifold pressure pu_w with ratio fkmsdk_w of the actual volumetric air flow and the modeled volumetric air flow exceeds actual ambient pressure puvl_w in a predetermined time TLBKKZU by more than a predetermined difference DPULBKLE. Predetermined time TLBKKZU is a debounce time here. If the product has a smaller difference from actual ambient pressure puvl_w in time TLBKKZU, it is determined in step S49 that the charge movement flap is jammed in the open position, because the charge movement flap has no influence on the secondary load offset in this position. After a certain delay time after steps S47 and S48, the position check is repeated. The erroneous charge movement flap position is maintained until the beginning of a new position check, until a new position is detected or the prior position is confirmed again. It is not possible for the incorrectly closed position of the charge movement flap to first be detected and then the incorrect open position of the charge movement flap to be detected during the position check.

In other internal combustion engines, the method may be adapted to the existing sensor system. The basic principle of a comparison of a modeled volumetric air flow (a modeled air quantity) to an actual volumetric air flow (a measured air quantity) in the event of an error of the charge movement flap remains the same in all systems, however, if these two values are available. Of course, the present invention is applicable not only in the case of the naturally aspirated gasoline engines, but rather also in the case of other internal combustion engines.

What is claimed is:

1. A method for detecting a jammed charge movement flap of an internal combustion engine, the method comprising:
    ascertaining a measured volumetric air flow of the internal combustion engine and a modeled volumetric air flow of the internal combustion engine;
    selecting an allowable predefined value from which the measured volumetric air flow may deviate from the modeled volumetric air flow;

comparing the measured volumetric air flow and the modeled volumetric air flow to determine if a deviation of the measured volumetric air flow from the modeled volumetric air flow is greater than the predefined value; and in response to a determination that a deviation of the measured volumetric air flow from the modeled volumetric air flow is greater than the predefined value, automatically detecting a jammed charge movement flap.

2. The method according to claim 1, wherein the deviation of the measured volumetric air flow from the modeled volumetric air flow occurs at an operating point of the internal combustion engine at which the charge movement flap assumes a completely open position as a setpoint position.

3. The method according to claim 2, wherein a charge movement flap which is jammed open is detected if the measured volumetric air flow deviates by a first value from the modeled volumetric air flow.

4. The method according to claim 2, wherein a charge movement flap which is at least partially jammed closed is detected if the measured volumetric air flow deviates by a second value, which has an absolute value greater than the first value, from the modeled volumetric air flow.

5. The method according to claim 1, wherein a position of a throttle valve is incorporated in the modeled volumetric air flow.

6. The method according to claim 1, wherein the measured volumetric air flow is determined from a signal of an air flow meter.

7. The method according to claim 1, wherein the measured volumetric air flow is determined from a signal of an intake manifold pressure sensor.

8. The method according to claim 1, wherein an ambient pressure, which is ascertained using an intake manifold pressure sensor at full load, is incorporated as a reference value in a determination of the modeled volumetric air flow.

9. The method according to claim 8, wherein the reference value remains valid only for a limited time.

10. A device, which is a control unit for an internal combustion engine, comprising:
   an ascertaining arrangement for ascertaining a measured volumetric air flow of an internal combustion engine and a modeled volumetric air flow;
   a selecting arrangement to select an allowable predefined value from which the measured volumetric air flow may deviate from the modeled volumetric air flow;
   a comparing arrangement to compare the measured volumetric air flow and the modeled volumetric air flow to determine if a deviation of the measured volumetric air flow from the modeled volumetric air flow is greater than the predefined value;and
   a detecting arrangement to automatically detect a jammed charge movement flap of the internal combustion engine, in response to a determination that a deviation of the measured volumetric air flow from the modeled volumetric air flow is greater than the predefined value.

* * * * *